United States Patent
Inagaki

(10) Patent No.: US 7,868,052 B2
(45) Date of Patent: Jan. 11, 2011

(54) METHOD FOR RECYCLING RECOVERED DISCS, FLAME RETARDANT RESIN COMPOSITION AND FLAME RETARDANT RESIN MOLDED PRODUCTS

(75) Inventor: Yasuhito Inagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1248 days.

(21) Appl. No.: 11/152,189

(22) Filed: Jun. 15, 2005

(65) Prior Publication Data

US 2005/0286397 A1 Dec. 29, 2005

(30) Foreign Application Priority Data

Jun. 24, 2004 (JP) .............................. P2004-186928

(51) Int. Cl.
*C08J 11/04* (2006.01)
(52) U.S. Cl. ........................................ 521/40; 521/40.5
(58) Field of Classification Search .................. 521/40, 521/40.5
See application file for complete search history.

(56) References Cited

U.S. PATENT DOCUMENTS

| | | | |
|---|---|---|---|
| 6,355,739 B1 * | 3/2002 | Tsai et al. | 525/461 |
| 6,433,050 B1 * | 8/2002 | Shinomiya et al. | 524/265 |
| 6,436,197 B1 * | 8/2002 | Sapienza et al. | 134/16 |
| 6,569,259 B1 | 5/2003 | Kagawa | |

FOREIGN PATENT DOCUMENTS

| | | |
|---|---|---|
| JP | 05-217219 | 8/1993 |
| JP | 07-205154 | 8/1995 |
| JP | 08-164524 | 6/1996 |
| JP | 09-245376 A | 9/1997 |
| JP | 11-057683 | 3/1999 |
| JP | 2000-331384 A | 11/2000 |
| JP | 2001-287225 | 10/2001 |
| JP | 2001-310970 | 11/2001 |
| JP | 2003-200133 | 7/2003 |
| WO | WO-00/58957 A1 | 10/2000 |

OTHER PUBLICATIONS

Japanese Office Action issued Jun. 8, 2010 for corresponding Japanese Application No. 2004-186928.

* cited by examiner

*Primary Examiner*—Edward J Cain
(74) *Attorney, Agent, or Firm*—Rader, Fishman & Grauer PLLC

(57) ABSTRACT

A recovered disc of a structure in which plural disc substrates are bonded together with an adhesive, is to be recycled. To this end, there is provided a recycling method for a recovered disc wherein a recovered disc, containing a material of at least one coating film, out of a reflective film, a recording film, a protective film and an ink film, deposited on a disc substrate in addition to an adhesive used for bonding a plurality of the disc substrates together, is used as a starting material for preparing a flame retardant resin composition or resin molded product.

27 Claims, 1 Drawing Sheet

METHOD FOR RECYCLING RECOVERED DISCS, FLAME RETARDANT RESIN COMPOSITION AND FLAME RETARDANT RESIN MOLDED PRODUCTS

CROSS REFERENCES TO RELATED APPLICATIONS

The present invention contains subject matter related to Japanese Patent Application JP 2004-186928 filed in the Japanese Patent Office on Jun. 24, 2004, the entire contents of which are incorporated herein by reference.

BACKGROUND OF THE INVENTION

1. Field of the Invention

This invention relates to a method for recycling recovered discs, each including two disc substrates bonded together by an adhesive, such as a DVD (Digital Versatile Disc), a flame retardant resin composition, and a flame retardant resin molded product, recycled by such method.

2. Description of Related Art

DVD-Video, DVD-Audio, DVD-ROM, DVD±R, DVD±R/W and DVD-RAM, for example, collectively termed a DVD, are finding widespread use as a medium for reproducing or recording pictures, music or data. As a matter of course, the DVDs, if used up, have to be disposed of in large quantities as a waste material in the same way as conventional tape-shaped mediums, such as VHS tapes, 8 mm tapes or music tapes.

Meanwhile, the DVD is of a structure composed of two disc substrates bonded together with an adhesive. In addition, there are contained in the DVDs a large variety of film materials, such as reflective films, recording films, or printing ink, formed on the disc substrate. Hence, if a DVD is recovered and reused as the starting material for the disc, the above additives are mixed as foreign matter, thus posing a problem that optical properties of high reliability may not be achieved.

Thus, there have so far been proposed a wide variety of techniques for exfoliating and removing the above additives contained in the recovered discs by treatment thereof with suitable chemicals (see, for example, the Patent Publications 1 to 7).

However, these conventional methods use a large quantity of chemicals and yield a large quantity of liquids and, therefore, are a problem from the perspective of saving resources or environmental protection. In addition, these techniques are mostly directed to a disc including a sole disc substrate, such as CD-DA, CD-R, CD-ROM, CD-R/W or CD-RAM, referred to below collectively as CDs, and cannot be directly applied to a DVD obtained by tightly bonding two disc substrates together using an adhesive.

Under the above circumstances, it is strongly desired for the public interest that the DVDs, estimated to be recycled in the future in large quantities, will be recycled efficaciously.

[Patent Publication 1] Japanese Laid-Open Patent Publication H7-205154

[Patent Publication 2] Japanese Laid-Open Patent Publication 2003-200133

[Patent Publication 3] Japanese Laid-Open Patent Publication H5-217219

[Patent Publication 4] Japanese Laid-Open Patent Publication 2001-287225

[Patent Publication 5] Japanese Laid-Open Patent Publication H11-57683

[Patent Publication 6] Japanese Laid-Open Patent Publication H8-164524

[Patent Publication 7] Japanese Patent 3270037

OBJECTS AND SUMMARY OF THE INVENTION

In view of the state of the related art, as discussed above, it is desirable to provide a method for recycling a recovered disc of a structure composed of plural disc substrates bonded together with an adhesive, a flame retardant resin composition, and a flame retardant molded product recycled by such method.

According to the present invention, there is provided a recycling method for a recovered disc wherein a recovered disc, containing a material of at least one coating film, out of a reflective film, a recording film, a protective film and an ink film, deposited on a disc substrate in addition to an adhesive used for bonding a plurality of the disc substrates together, is used as a starting material for preparing a flame retardant resin composition or a resin molded product.

The present invention also provides a flame retardant resin composition prepared from a recovered disc as a starting material, the recovered disc containing, along with an adhesive used for bonding a plurality of disc substrates together, at least one of the coating materials of a reflective film, a recording film, a protective film and an ink film formed on the disc substrates.

The present invention also provides a flame retardant resin molded product prepared from a recovered disc as a starting material, the recovered disc containing, along with an adhesive used for bonding a plurality of disc substrates together, at least one of the coating materials of a reflective film, a recording film, a protective film and an ink film formed on the disc substrates.

According to the present invention, a recovered disc, including, in addition to an adhesive used for bonding a plurality of disc substrates together, at least one of the coating materials of a reflective film, a recording film, a protective film and an ink film formed on the disc substrates, is used as a starting material for preparing the flame retardant resin composition or the flame retardant resin molded product, whereby the recovered discs may be efficaciously recycled without using a large quantity of chemicals or generating waste liquids.

DESCRIPTION OF THE PREFERRED EMBODIMENTS

Figure 1:
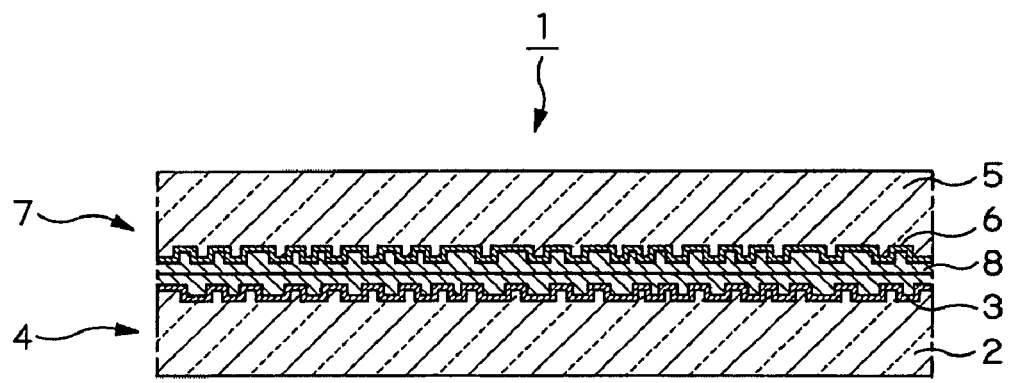
FIG. 1 is a cross-sectional view showing a structure of a DVD.

Referring to the drawings, a method for recycling recovered discs, a flame retardant resin composition, and a flame retardant resin molded product according to the present invention now will be explained in detail. [0014]

Figure 2:
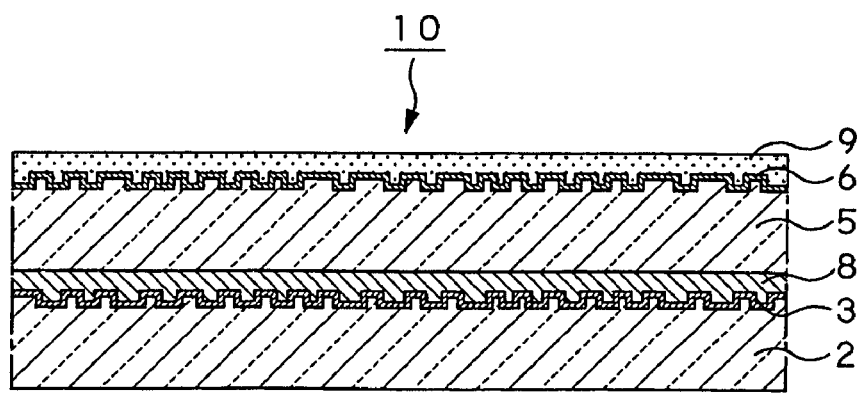
FIG. 2 is a cross-sectional view showing another structure of a DVD.

The DVDs to be recovered by the recycling method according to the present invention may be exemplified by, for example, DVDs (Digital Versatile Discs) 1, shown in FIGS. 1 and 2, respectively.

Referring to FIG. 1, the DVD 1 is formed by bonding a first recording medium 4, including a light transmitting first disc substrate 2 and a first recording film 3 formed on one surface of the first disc substrate, to a second recording medium 7, including a light transmitting second disc substrate 5 and a second recording film 6 formed on one surface of the second disc substrate 7, using a light transmitting adhesive 8, with the surface of the first recording medium carrying the first recording film 3 and the surface of the second recording medium 7 carrying the second recording film 6 facing each other.

Referring to FIG. 2, the DVD 10 is formed by bonding a first recording medium 4, including a light transmitting first disc substrate 2 and a first recording film 3 formed on one surface of the first disc substrate, to a second recording medium 7, including a light transmitting second disc substrate 5 and a second recording film 6 formed on one surface of the second disc substrate 7, using a light transmitting adhesive 8, with the surface of the first recording medium carrying the first recording film 3 and the surface of the second recording medium 7 carrying the second recording film 6 lying on the same sides of the recording mediums. On the second recording film 6, there is formed a protective film 9 for protecting the second recording film 6.

The recovered DVDs are not limited to the above DVDs 1, 10 and may be enumerated by a single side single layer disc, a double side single layer disc, a single side dual layer disc, and a double side dual layer disc.

The recovered DVDs may contain one or more coating films, such as reflecting films, protective films or ink films, in addition to the aforementioned first and second recording films 3, 6 of the above DVDs 1, 10.

The DVDs 1, 10 may be enumerated by a replay-only DVD-5, -9, -10 and -18, a DVD-Video, a DVD-Audio, a DVD-ROM, a write-once DVD-R, a DVD+R, a rewritable DVD-RW, a DVD+RW and a DVD-RAM.

These DVDs 1, 10 are routinely produced by a reaction of a bivalent phenol and a carbonate precursor. That is, the DVDs 1, 10 are routinely produced by a solution method or by a melting method, that is, by a reaction of bivalent phenol and phosgen, or by an ester exchange reaction of a bivalent phenol and a diphenyl carbonate.

The bivalent phenol used here may be enumerated by hydroquinone, resorcinol, 4,4'-biphenol, bis(4-hydroxyphenyl) methane, 1,1-bis(4-hydroxyphenol) ethane, 2,2-bis(4-hydroxyphenyl)propane, 2,2-bis(3-methyl-4-hydroxyphenyl) propane, 2,2-bis(3,5-dibutyl-4-hydroxyphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis (4-hydroxyphenyl)penthane, 4,4'-(m-phenylene isopropylidene)diphenol, 4,4'-(p-phenylene diisopropylidene)diphenol, 9,9-bis(4-hydroxyphenyl)fluorene, 1,1-bis (4-hydroxyphenyl)-4-isopropyl cyclohexane, bis(4-hydroxyphenyl)ether, bis(4-hydroxyphenyl)sulfide, and bis(4-hydroxyphenyl)sylfone. As bivalent phenols, 2,2-bis(4-hydroxyphenyl)alkanes and, in particular, 2,2-bis(4-hydroxyphenyl)propane, are preferably used.

As carbonate precursors, carbonyl halides, carbonate esters or haloformates, for example, may be used. Specified examples of the carbonate precursors include phosgene, diphenyl carbonates and dihaloformates of bivalent phenols.

As these aromatic polycarbonates, those having a weight average molecular weight, as measured by GPC and calculated as polystyrene, of 10,000 to 100,000, and preferably 30,000 to 60,000, or those having the viscosity average molecular weight of 10,000 to 60,000, preferably 14,000 to 20,000, are usually employed. It is noted that the viscosity average molecular weight may be calculated by measuring the viscosity of a methylene chloride solution at 20° C. with an Ubelode viscosimeter and by making calculations from the ultimate viscosity.

Meanwhile, if the molecular weight is outside the above range, it becomes difficult for the resin to satisfy resin characteristics when the ultimate product used is a resin composition or a resin molded product. That is, if the molecular weight is low or high, impact resistance is lowered or fluidity is worsened, respectively.

After molding the disc substrate with the above-described aromatic polycarbonates, a reflective film is deposited by sputtering on this disc substrate, a protective film is formed and two of the disc substrates are bonded together with an adhesive to produce the DVDs 1 and 10.

Meanwhile, according to the present invention, the method for recycling the recovered DVDs positively exploits the additives contained in the recovered DVDs 1, 10, in order to make the resin flame retardant. That is, the present inventors have found that, by using the above recovered DVDs either directly or in a state mixed in a preset amount with other resins, the resin composition or the resin molded product prepared from the recovered DVDs as the starting material may be improved in flame retardant properties.

The additives contained in these recovered DVDs may be enumerated by coating film materials, such as materials of adhesives, reflective films, recording films, protective films or ink films. Of these, the adhesive used for bonding DVDs 1 or 10 is efficacious for improving the flame retardant properties of the resin composition or the resin molded product.

Specifically, UV-ray curable compounds and photo-polymerization initiators are usually contained as essential components in an adhesive. As the UV-ray curable components, mono-functional or poly-functional (meth)acrylates are used as polymerizable polymers. These may be used alone or in combination.

The polymerizable polymers needed in the present invention may, for example, be defined as follows: That is, substituents of the mono-functional (meth)acrylates may be enumerated by alkyl groups (methyl, ethyl, propyl, -butyl, i-butyl, t-butyl, amyl, 2-ethylhexyl, octyl, nonyl, lauryl, dodecyl, tridecyl, hexadecyl, octadecyl, methoxyethyl, butoxyethyl, phenoxyethyl, cyclohexyl, stearyl, phenyl or benzyl), alkylether groups (methoxyethyl, butoxyethyl, phenoxyethyl, nonyphenoxyethyl), hydroxyalkyl groups (2-hydroxyethyl, 2-hydroxypropyl, 3-chloro-2-hydroxypropyl), aminoalkyl groups (dimethyl aminoethyl, diethyl aminoethyl), glycidyl, tetrahydro furfuryl, nonyphenoxyethyl tetrahydro furfuryl, caprolactone modified tetrahydrofurfuryl, caprolactone modified dipentaerythritol, diethylene glycol ethoxylate, alkyl modified dipentaerythritol, isobonyl, dicyclopentanyl, dicyclopentenyl and dicyclopentenyloxyethyl.

The substituents of poly-functional meth(acrylate) may be enumerated by alkylether groups (ethylene glycol, polyethylene glycol, polypropylene glycol, propylene glycol, tripropylene glycol, tripropylene glycol, 1,3-butylene glycol, neopentyl glycol), hydroxyalkyl groups (1,4-butanediol, 1,5-pentanediol, 3-methyl-1,5-pentanediol, 1,6-hexanediol, 1,8-octanediol, 1,9-nonanediol, tricyclodecane dimethanol, tris (2-hydroxyethyl)isocyanurate, diols of ethylene oxide adducts of bisphenol-A, glycerine, polyglycerine, pentaerythritol, or dipentaerythritol), di(meth)acrylates (diallylates of, e.g., polypropylene glycol, di(meth)acrylates of tris (2-hydroxyethyl)isocyanurates, di(meth)acrylates of diols obtained on adding not less than 4 mols of ethylene oxide or propylene oxide to 1 mol of neopentyl glycol, di(meth)acrylates of diols obtained on adding 2 mols of ethylene oxide or propylene oxide to 1 mol of bisphenol A, di(meth)acrylates of triols obtained on adding not less than 3 mols of ethylene oxide or propylene oxide to 1 mol of trimethylolpropane, di(meth)acrylates of diols obtained on adding not less than 4 mols of ethylene oxide or propylene oxide to 1 mol of bisphenol A, hydroxypivalic acid neopentyl glycol diacrylate, caprolactone modified hydroxypivalic acid neopentyl glycol diacrylate), tri(meth)acrylates (tri(meth)acrylate of triols obtained by adding not less than 3 mols of ethylene oxide or propylene oxide to 1 mol of trimethylolpropane, tris(2-hydroxyethyl)isocyanurate tri(meth)acrylate, trimethylolpropane tri(meth)acrylate, pentaerythritol tri(meth)acrylate), caprolactone modified tris {(meth)acryloxyethyl}isocyanurate, poly(meth)acrylates (poly(meth)acrylates of dipentaerythritol, poly(meth)acrylates of alkyl modified dipentaerythritol, phosphoric acid (meth)acrylates (alkylated phosphoric acid (meth)acrylate, ethylene oxide modified phosphoric acid (meth)acrylate, ethylene oxide modified alkylated phosphoric acid (meth)acrylate, and urethane (meth)acrylates (reaction products of organic polyisocyanates and hydroxyl(meth)acrylates or reaction products of polyols, organic polyisocyanates and hydroxyl(meth)acrylates).

The above substituents also may be N-vinyl-2-pyrrolidone, (meth)acrylamid, vinyl imidazole, 4-vinylpyridine, N-vinylformamide, vinyl acetate, acryloyl morpholine, N-vinyl caprolactam, (meth)acrylic acid, N-hydrozymethyl acrylamide or N-hydroxyethyl acrylamide and alkylether compounds thereof.

Polymerizable oligomers, such as polyester (meth)acrylate, polyether (meth)acrylate, epoxy(meth)acrylate and urethane (meth)acrylate, may be used in combination, as polymerizable monomers.

Photopolymerization initiators may be enumerated by 1-hydroxy cyclohexyl phenylketone, benzyl, benzoin isobutylether, 2,4-dimethylthio xanthone, 2,4-diethylthio xanthone, 2,4-diisopropylthio xanthone, 2-isopropylthio xanthone, 2-chlorothio xanthone, 2,4,6-trimethyl benzoyl diphenylphosphine oxide, 2-benzyl-2-2 dimethylamino-1-(4-morpholino phenyl)-butanone-1, bis(2,6-dimethoxy benzoyl)-2,2,2-trimethyl pentylphosphine oxide, benzoyl ethylether, benzyl dimethyl ketal, 2-hydroxy-2-methyl-1-phenyl-propane-1-on, 1-(4-isoproipylphenyl)-2-hydroxyl-2-methylpropane-on, 2-methyl-1-(4-methylthiophenyl)-2-morpholino-propanone-1-on, benzophenone, diethoxy acetophenone, 4-phenyl benzophenone, isophthalophenone, 2-hydroxy-2-methyl-1-phenylpropanone, benzoin isobutylether, benzoin-n-butyl ether, 2,2-dimethoxy-1,2-diphenylethane-1-on, methylphenyl glyoxylate, 3,6-bis(2-methyl-2-morpholino-propanonyl)-9-butyl-carbazole, isoacryl-4-(dimethylamino)benzoate, ethyl-4-(dimethylamino) benzoate, [4-(4-methylphenylthio)phenyl]phenylmethane, 4-benzoyl-4'-methyl-diphenyl sulfide, (1-6-η-cumene)(η-cyclopentadienyl)iron (1+) hexafluorated methyl phosphate (1−), 2-2-dimethoxy-2-2 phenyl acetophenone, Michler's ketones, 2-methyl-[4-(methylthio)phenyl]-2-morpholino-1-propanone, 2-benzyl-2-dimethylamino-1-(morpholino phenyl)-butanone-1,2-chloroxanthone, aromatic diazonium salts, aromatic sulfonium salts (4,4'-bis[di(β-hydroxyethoxy)phenyl sulphonio]phenylsulfide-bishexafluoro antimonate, 2,4-bis(trichloromethyl)-6-(4-methoxyphenyl)-1,3,5-triazine, triallylsulfonium hexafluoro ammonate, triallyl sulfonium hexafluorophosphate), aromatic iodonium salts {tolylcumyl iodonium tetrakis(pentafluorophenyl)borate}.

Among the aforementioned adhesives (UV ray curable compounds+photopolymerization initiators), those having hydroxyl groups, phosphoric acid (phosphate) groups, sulfonium salt groups, diazonium salt groups, iodonium salt groups and carboxyl groups are preferred. By the presence of these specific groups, the resin is charred at the time of combustion, thus improving the flame retardant properties of the resin. Out of these specific groups, the hydroxyl groups are most preferred. The content of these specific groups may be confirmed by measurement of the resin concerned with, e.g., FT-IR.

The content of these adhesives in the flame retardant resin composition or in the flame retardant resin molded products is preferably 0.005-20 wt %, more preferably 0.05-10 wt %, and most preferably 0.5 to 5 wt %. If the content of the additive is smaller than this limit, the favorable effect in raising the flame retardant properties of the resin can scarcely be acquired, whereas, if the content of the additive is larger than this limit, the properties, such as the mechanical properties of the resin, are impaired.

At least one of the reflective films, recording films, protective films or ink films, as films of coating materials, may be used as a component(s) other than the above adhesives.

Specifically, at least one of Al, Au and Si may be named as the material of the reflective film. Usually, there is no limitation as long as the material is of the grade used for an optical disc. Thus, the material may be an unadulterated substance or a mixture (alloy) with other materials.

As the recording films, organic dyes, such as cyanine-, azo- or phthalocyanine-based dyes, or inorganic alloys, composed of at least one of Te, Se, S, Ge, In, Sb, Fe, Tb, Co, Ag, Ce and Bi may be used.

The protective film is composed of, for example, (A) a prepolymer component, (B) a monomer component, (C) a polymerization initiator component and other components (D).

The component (A), may be enumerated, for example, by polyester acrylate, polyurethane acrylate, epoxy acrylate and polyether acrylate.

The component (B) for example, may be, for example, a component (B1), improving the strength of the cured coating film of the composition, and a diluent composition (B2), effectively lowering the concentration of the composition.

There may be contained preferably two and more, and more preferably three or more, of the (meth)acryloyl groups in a molecule of the component (B1). For example, the compounds containing two or more of the (meth)acryloyl groups in a molecule may be dicyclopentanyl di(meth)acrylate or bisphenol A di(meth)acrylates, modified by alkylene oxides, such as ethylene oxide or propylene oxide. The compounds containing three or more of the (meth)acryloyl groups in a molecule may be trimethylolpropane tri(meth)acrylates, trimethylolpropane tri(meth)acrylates, modified by alkylene oxides, such as ethylene oxide or propylene oxide, dipentaerythritol hexa(meth)acryate, dipentaerythritol monohydroxypenta(meth)acryate, alkyl modified dipentaerythritol penta(meth)acryate, alkyl modified dipentaerythritol tetra (meth)acryate, pentaerythritol tri(meth)acryate, pentaerythritol tetra(meth)acryate, tris[(meth)acryloxyethyl]isocyanurate, caprolactone modified tris[(meth)acryloxyethyl]isocyanurate and ditrimethylolpropane tetra(meth)acrylates.

The component (B2) preferably includes at most two of the (meth)acryloyl groups in a molecule. The component (B2) may be exemplified by tripropylene glycol di(meth)acrylates, 1-6-hexanediol(meth)acrylates, neopentyl glycol di(meth) acrylates, diethylene glycol di(meth)acrylates, 2-(2-ethoxyethoxy)ethyl (meth)acrylates, tetrahydro furfuryl(meth)acrylate, 2-hydroxy(meth)acrylate, isobornyl(meth)acrylates, cyclohexyl(meth)acrylates, dicyclopentanyl (meth)acrylates, amino(meth)acrylate: N,N-dimethylaminoethyl(meth)acrylates, N,N-diethylaminoethyl(meth)acrylates, acrylmorpholine, aminoacrloamide: N-isopropyl(meth)acrylamides, N,N-dimethylacrylamide and N,N-dimethylaminopropyl (meth)acrylamide.

In the above protective film, the proportions of the components A 1, B1 and B2 used are determined from the coating film strength desired. Meanwhile, the higher the proportion of the component B2, the lower the viscosity of the protective film becomes, however, the weaker the strength of the coating film becomes.

As the component (C), a variety of photopolymerization initiators and photopolymerization sensitizers used, e.g., in routine UV-ray curable resins, may be used. Examples of component (C) include benzoin, benzoin methylether, benzoin ethylether, benzoin isobutylether, 2-methylbenzoin, benzylmethylketal, 1-(4-isopropyl)-2-hydroxyl-2-methyl-propane-1-on, 1-(4-dodecylphenyl)-2-hydroxyl-2-methyl-propane-1-on, 1-hydroxycyclohexyl phenylketone, 2-hydroxy 2-methyl-1-phenylpropane-1-on, methylphenyl glyoxylate, 2-methyl-1-[4-(methylthio)phenyl]-2-morpholinopropane-1,2-benzyl-2-dimethylamino-1-(4-morpholinophenyl)-butanone-1,2,4,4,6-trimethyl benzoyl diphenylphosphine oxide, benzophenone, benzoyl, methyl benzoate, benzophenone-based sensitizers: hindered amines (HALS), such as triethylamine, methyl diethanolamine, triethanolamine, methyl diethanbolamine, and triethanolamine, bis(N-methyl-2,2,6,6-tetramethyl-4-piperidynyl)sebacate, phenyl-4-piperidynyl carbonate, 2-dimethylaminoethyl benzoate, p-dimethylaminoacetophenone, p-dimethylamino ethyl benzoate and p-dimethylamino isoamyl benzoate.

As the component (D), a variety of additives, such as adhesiveness imparting agents, polymerization inhibitors or surfactants may be used as necessary. Examples of the adhesiveness imparting agents include ethylene oxide modified succinic acid (meth)acrylate, ethylene oxide modified phthalic acid (meth)acrylate, ethylene oxide modified phosphoric acid (meth)acrylate, and hydroxynaphtoxy pro(meth)acrylate. Examples of the polymerization inhibitors include hydrochinone, hydrochinone monomethylether, t-butyl catechol, p-benzoquinone, 2,5-t-butylhydroquinone and phenothiazine. Examples of the surfactants include e.g. fluorine-based nonionic surfactants.

Those of the above-described protective films (prepolymer component+monomeric components+polymerization inhibitor components+other components) having hydroxyl groups, phosphoric acid (phosphate) groups, sulfonium salt groups, diazonium salt groups, iodonium acid and carboxyl groups may be used in conjunction with the above adhesives to contribute to an improvement in the flame retardant properties of the resin compositions or the resin molded products in question.

Usually, pigments, (photo) polymerization initiators, prepolymers, polyfunctional acrylate monomers and a variety of assistant agents are contained in the ink. Except for the pigments, the above agents are equivalent to or analogous with the above additives. Examples of the pigments in the ink include at least one of carbon black, titanium oxide, copper, compounds thereof, iron oxides, silica, molybdenum and compounds thereof.

The above additives, mixed in the recovered DVDs along with polycarbonates, act to improve the flame retardant properties of the resin of the recovered DVDs mixed or not mixed with other resins.

These recovered DVDs may be those produced in a plant and recovered, including runners, molding scraps and scraps of the feedstock pellets, pre-sale rejects or stock materials. The recovered DVDs also may be recovered from the market. It is noted that the DVDs recovered in a plant or recovered prior to sale are usually of a more uniform quality than those recovered from the market and therefore more desirable for reuse. Meanwhile, the recovered DVDs, which of course may be used alone as the resin composition or resin molded products, also may be used as a mixture with other sorts of resins.

The resins that may be mixed with the recovered DVDs may be enumerated by PC, ABS (acrylonitrile butadiene styrene resins), AS (acrylonitrile styrene resins), PS (polystyrene), HIPS (high impact polystyrene), SPS (syndiotactic polystyrene), SBR (styrene butadiene rubber), SBS (styrene butadiene styrene rubber), methyl methacrylate styrene resin, MBS (methyl methacrylate butadiene styrene resin), isoprene styrene rubber, isoprene rubber, PB (polybutadiene), butadiene acryl rubber, isoprene acryl rubber, ethylene propylene rubber, PMMA (esters of polymethacrylic acid), PPS (polyphenylene sulfide), PPE (polyphenylene ether), PET (polyethylene terephthalate), PBT (polybutylene terephthalate), PP (polypropylene), PE (polyethylene), Nylon 6, Nylon 66, Nylon 12, and alloys of PC/ABS, PC/PS, PC/HIPS, PC/PP, PC/PE, PC/PMMA, and PC/PET and PC/PBT alloys. Of these, PC, ABS, AS, PS, HIPS, PC/ABS alloys, PC/PS alloys, PC/HIPS alloys, PC/PP alloys, PC/PE alloys, PC/PMMA alloys, PC/PET alloys, PC/PBT alloys and PC/Nylon alloys are most preferred.

The above resins are those sold for general-purpose usage, exhibiting high tenacity, high impact strength, high abrasion resistance, high sliding, high thermal resistance, high flame retardant properties, high transparency, high luster, and high resistance against chemicals, or for coating, for various grades. The above resins may contain various additives for resins, such as antistatic agents, colorants, pigments, antioxidants, flame retardant agents, plasticizers, light fastness improvers, compatibilizing agents, surface treatment agents, modifiers, coloring agents (e.g., carbon black), glass fiber, paper, or non-woven cloths. The resins also may be manufactured in a plant but not sold, such as for runners or scraps of feedstock pellets, or regenerated resins recovered from a plant.

If regenerated resins are used, those generated in a plant or recovered products emanating from the standardized products (products of the same article or the same lot of articles) are of uniform physical properties, in most cases, and hence are more desirable from the perspective of recycling.

The above-mentioned resins may be mixed with the recovered DVDs to prepare a variety of grades of flame retardant resin compositions or resin molded products.

As a matter of course, if the recovered DVDs per se are used as the resin compositions or resin molded products, the favorable effect of flame retardant properties may be obtained. If the recovered DVDs are mixed with the above-mentioned other resins, the recovered DVDs are contained preferably in an amount corresponding to 1 to 100 wt %, more preferably in an amount corresponding to 5 to 90 wt %, and most preferably in an amount corresponding to 10 to 80 wt %. It is because the flame retardant properties cannot be achieved with the blend ratio lower than the above limit value.

When the recovered DVDs are mixed with other resins, compatibilizing agents may be added. Examples of the compatibilizing agents include epoxy modified block copolymers and graft polymers of vinyl monomers with a polyolefin main chain (LDPE-g-PS, PP-g-PS, EGMA-g-PS, EEA-g-PS, EVA-g-PS, E/EA/MAH-g-PS, LDPE-g-PMMA, EGMA-g-PMMA, EEA-g-PMMA, EVA-g-PMMA, E/EA/MAH-g-PMMA, LDPE-g-AS, PP-g-AS, EGMA-g-AS, EEA-g-AS, EVA-g-AS or E/EA/MAH-g-AS). It is noted that EGMA, EEA, EVA and E/EA/MAH stand for an ethylene-glycidyl methacrylate co-polymer, an ethylene-ethyl acrylate copolymer, an ethylene-vinyl acetate co-polymer and an ethylene-ethyl acrylate-maleic anhydride copolymer. Although there is no limitation to the amount of addition of the compatibilizing agents, it is usually 0.1 to 20 wt %, and preferably 1 to 10 wt %, based on the weight of the resin.

Although the flame retardant properties of the resin may be improved by using the recovered DVDs, it is also possible to use routine flame retardant agents for resins. Since the basis material of the recovered DVDs is a polycarbonate resin, the flame retardant agents routinely used for PC are desirably used as the flame retardant agents. For example, at least one flame retardant agent selected from the group of the flame retardant agents consisting of a halogen-based flame retardant agent, a phosphorus-based flame retardant agent, a nitrogen-based flame retardant agent, an inorganic flame retardant agent, a silicon-based flame retardant agent, a metal-salt based flame retardant agent, or a fluorine-based flame retardant agent may be used.

Of these, the halogen-based flame retardant agents may be enumerated by halogenated bisphenol, aromatic halogen compounds, halogenated polycarbonates, halogenated aromatic vinyl polymers, halogenated cyanurate resins, and halogenated polyphenylene ethers. Preferred halogen-based flame retardant agents may be enumerated by decabromo diphenyl ether, tetrabrom bisphenol A, oligomers of tetrabrom bisphenol A, bromated bisphenol-based phenoxy resins, bromated bisphenol-based polycarbonates, bromated polystyrene, bromated cross-linked polystyrene, bromated polyphenylene ether, polydibrom phenylene ethers, decabromdiphenyl ether bisphenol condensates, halogen-containing esters of phosphoric acid, and fluorine-based resins.

The amount of addition of the above-described halogen-based flame retardant agents is usually 0.1 to 30 wt % and preferably 1 to 20 wt %. If, the amount of addition exceeds the above range, the properties of the resin are lowered. If conversely, the amount of addition is lower than the above range, the favorable effect of the halogen-based flame retardant agents in improving the flame retardant properties is lowered.

The phosphorus-based flame retardant agents may be enumerated, e.g., by organic phosphorus compounds, red phosphorus and inorganic phosphates.

The organic phosphorus compounds may be enumerated by, for example, phosphine, phosphine oxide, biphosphine, phosphonium salts, phosphinates, esters of phosphoric acid, esters of phosphorous acid and, more specifically, by triphenyl phosphate, methyl neopentyl phosphite, pentaerythrithol diethyl diphosphite, methyl neopentyl phosphonate, phenyl neopentyl phosphate, pentaerythrithol diphenyl diphosphate, dicyclopentyl hypodiphosphate, dineopentyl hypophosphite, phenyl pyrocatechol phosphate, ethyl pyrocatechol phosphate, dipyrocathchol hypodiphosphate, phenoxyamino phosphasen and phenoxy fluoroalkyl phosphasen. The most preferred are aromatic phosphoric acid monomers and condensates.

As red phosphorus, not only commonplace red phosphorus, but also commonplace red phosphorus having its surface coated with a coating film of a metal hydroxide selected from the group of aluminum hydroxide, magnesium hydroxide, zinc hydroxide and titanium hydroxide, commonplace red phosphorus having its surface coated with a coating film of a thermosetting resin and a metal hydroxide selected from the group of aluminum hydroxide, magnesium hydroxide, zinc hydroxide and titanium hydroxide, and commonplace red phosphorus having its surface coated with a coating film of a metal hydroxide selected from the group of aluminum hydroxide, magnesium hydroxide, zinc hydroxide and titanium hydroxide and with a coating film of a thermosetting resin, in this order, may be used.

The inorganic phosphates may be exemplified by ammonium polyphosphate. The amount of addition of the above-described phosphorus-based flame retardant agents is usually 0.1 to 30 wt % and preferably 1 to 20 wt %. If the amount of addition exceeds this range, the properties of the resin, such as thermal resistance, are impaired. If conversely the amount of addition is smaller than the above range, the favorable effect of the flame retardant agents in improving the flame retardant properties is lowered.

The nitrogen-based flame retardant agents may be exemplified by, for example, at least one selected from the group of triazine-based compounds, triazole-based compounds, tetrazole-based compounds, phosphasen-based compounds and diazo-based compounds. Specified examples of the nitrogen-based flame retardant agents include melamine, melam, melem, mellon, melamine cyanurate, melamine phosphate, succino guanamine, adipo guanamine, methyl glutaro guanamine, melamine resins and BT resins, Of these, melamine cyanurate is most preferred.

The amount of addition of the above-described nitrogen-based flame retardant agents is usually 0.1 to 30 wt % and preferably 0.5 to 10 wt %. If the amount of addition exceeds this range, the properties of the resin are impaired. If conversely the amount of addition is smaller than the above range, the favorable effect of the flame retardant agents in improving the flame retardant properties is lowered.

The inorganic flame retardant agents may be enumerated by silica, sodium sulfate, calcium sulfate, potassium sulfate, aluminum hydroxide, magnesium hydroxide, zirconium hydroxide, barium hydroxide, calcium hydroxide, dolomite, hydrotalcite, basic magnesium carbonate, hydrates of tin oxide, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide, tungsten oxide, aluminum, iron, titanium, manganese, zinc, molybdenum, cobalt, bismuth, chromium, nickel, copper, tungsten, tin, antimony, SUS, zinc borate, zinc metaborate, barium metaborate, zinc carbonate, magnesium carbonate, calcium carbonate, barium carbonate, and hydrated glass. These may be used alone or in combination. Of these, aluminum hydroxide, magnesium hydroxide, basic magnesium carbonate, hydrotalcite and hydrated glass are most preferred.

The amount of addition of the above inorganic flame retardant agent is usually 0.1 to 300 wt % and preferably 1 to 30 wt %. If the amount of addition exceeds the above range, the properties of the resin, such as impact resistance, are impaired. If conversely the amount of addition is smaller than the above range, the favorable effect of the flame retardant agents in improving the flame retardant properties is lowered.

The silicone-based flame retardant agents may be enumerated by silicone compounds and silane compounds. Of these, the silicone compounds may be enumerated by silicone oil, as polydiorgano siloxane, and a silicone resin of a polymer and a copolymer, obtained on combining structural units of $SiO_2$, $RSiO_{3/2}$, $R_2SiO$, $R_3SiO_{1/2}$ or $R1_aR2_bSiO_{(4-a-b)/2}$, where R1 is a functional group, R2 is a hydrocarbon with 1 to 12 carbon atoms and a, b denote numbers satisfying the relationship of $0<a\leqq3$, $0\leqq b<3$ or $0<a+b\leqq3$. In the above formulas, R may be enumerated by a hydroxyl group, a methyl group, an ethyl group, a propyl group, a phenyl group, a benzyl group, a vinyl group, an alkoxy group, aryloxy, a polyoxy alkylene group, a hydroxyl group, a carboxyl group, a cyanol group, an amino group, a mercapto group, and an epoxy group. Of these, the alkyl groups (methyl and phenyl groups), the alkoxy group, the hydroxyl group, the carboxyl group, the amino group and the epoxy group are preferred. The average number molecular weight of these silicone-based resins is preferably 200 to 5,000,000. The silicone-based resins may be in the form of any of oil, varnish, gum, powders or pellets.

The silane compounds may be enumerated by polyalkylsilane compounds and polycarbosilane compounds. Of these, polymethyl phenylsilane, polydiphenyl silane and polyphenyl silane are representative compounds. These compounds may be terminated by an OH group or an alkyl group, or may have a cyclic structure.

The amount of addition of the above-described silicone-based flame retardant agents is 0.01 to 10 wt % and preferably 0.1 to 5 wt %, based on the weight of the resin part. If the amount of addition exceeds the above range, the favorable effect in improving the flame retardant properties is lowered. If, conversely, the amount of addition is lower than the above range, the appearance or the mechanical properties of the resin, such as impact resistance, tends to be lowered.

The metal-salt based flame retardant agents may be enumerated by inorganic acids (salts) or organic acids (salts). The organic acids (salts) may be enumerated by organic sulfonic acids (sulfonates), organic sulfuric acids (sulfates), organic phosphoric acids (phosphates), organic boric acids (borates) and organic carbonic acids (carboxylates). The counter ions (metals) used preferably for a variety of acids or salts are alkali metals (sodium, lithium, potassium or cesium), alkali earth metals (magnesium, calcium, strontium or barium) or Zn, Sn, Al or Sb. The organic acids (salts) may be substituted by halogens, such as fluorine, chlorine or bromine.

Specifically, the metal-salt based flame retardant agents may be enumerated by perfluoro alkane sulfonates (perfluoro methane sulfonates, perfluoro ethane sulfonates, perfluoro propane sulfonates, perfluoro butane sulfonates, perfluoro methylbutane sulfonates, perfluoro hexane sulfonates, perfluoro heptane sulfonates, perfluoro octane sulfonates), alkyl sulfonic acids (sulfonates), benzenesulfonic acids (benzenesulfonates), alkylbenzene sulfonic acids (alkylbenzene sulfonates), diphenyl sulfonic acids (diphenyl sulfonates), naphthalene sulfonic acids (naphthalene sulfonates), diphenylsulfone-3-sulfonic acids (sulfonates), 2,5-dichlorobenzine sulfonic acids (sulfonates), 2,4,5-trilolo benzene sulfonic acids (sulfonates), diphenyl sulfone-3,3-disulfonic acids (sulfonates), naphthalene trisulfonic acids (trisulfonates), aromatic sulfone imide metal-salts, fluorine substituted compounds thereof, and sulfonic acids (sulfonates), sulfuric acids (sulfates), boric acids (borates) and carboxylic acids (carboxylates) linked to aromatic rings of styrene (co) polymers or aromatic groups containing polymers, such as polyphenylene ethers, polycarbonates or polyethylene terephthalates. The sulfonic acids (sulfonates), representative of the metal-salt based flame retardant agents, may be exemplified by sulfonic acid metal-salts, such as PS resins (polystyrene), HIPS resins (high-impact polystyrene), AB resins (acrylonitrile-styrene copolymers), ABS resins (acrylonitrile-butadiene-styrene copolymers), polyphenylene ethers, polycarbonates or polyethylene terephthalates, metal-salts of hydrolyzates of the AB resin or the ABS resins by heated concentrated sulfuric acid, and ion exchange resins. Although there is no limitation on the rate of introduction of the acids (salts) represented by the sulfonic acid groups, the rate is based on substitution of 0.1 to 100 mol %.

The organic carboxylic acids (carboxylates) may be enumerated by perfluoro formic acids (formats), perfluoromethane carboxylic acids (carboxylates), perfluoroethane carboxylic acids (carboxylates), perfluoropropane carboxylic acids (carboxylates), perfluorobutane carboxylic acids (carboxylates), perfluoro methylbutane carboxylic acids (carboxylates), perfluoro hexane carboxylic acids (carboxylates), perfluoro heptane carboxylic acids (carboxylates) and perfluoro octane carboxylic acids (carboxylates).

The above metal-salt based flame retardant agents may be used either singly or in combination.

The amount of addition of the above metal-salt based flame retardant agents is 0.0005 to 5 wt %, preferably 0.001 to 2 wt %, and more preferably 0.05 to 1 wt %, based on the weight of the resin part of the resin composition or the resin molded product. It is not economically desirable to increase the amount of addition beyond this range, since no flame retardant effects corresponding to the increased amount of addition then can be produced.

The fluorine-based flame retardant agents are those resins containing fluorine atoms in the resin, and they may be enumerated by poly monofluoroethylene, poly difluoroethylene, poly trifluoroethylene, poly tetrafluoroethylene, and tetrafluoro/hexafluoro propylene copolymers. The above fluorine monomers may be used in conjunction with monomers, copolymerizable therewith, as necessary. The average molecular weight of these fluorine-based resins is preferably 100,000 to 10,000,000. In particular, the resins having fibril forming properties are desirable. The amount of addition of the fluorine-based flame retardant agents is 0 to 5 wt % and preferably 0.1 to 2 wt %, based on the weight of the resin part of the resin compositions or resin molded products. It is not economically desirable to increase the amount of addition beyond this range, since no flame retardant effects corresponding to the increased amount of addition then can be produced.

It is noted that the above-mentioned fluorine-based flame retardant agents are used mainly for preventing a drip in a majority of cases. The components used for preventing a drip, other than the above-mentioned fluorine-based flame retardant agents, may be enumerated by the above-mentioned silicone resins, phenolic resins, aramide resins (fibers) and polyacrylonitrile resins (fibers). One or more thermoplastic elastomeric materials, exemplified by polyolefinic, polyester, polyurethane, a 1,2-polybutadiene based material or a polyvinyl chloride material also may be added, if so desired.

According to the present invention, an organic filler also may be added to the flame retardant resin composition or resin molded product, if so desired. The organic filler may be exemplified by, for example, talcum, mica, wallastonite, Kaolin, diatomaceous earth, calcium carbonate, barium sulfate, glass fibers, carbon fibers, carbon black, potassium titanate and titanium oxide. Of these, talcum, mica and wallastonite are preferred.

As the inorganic fillers, those having an average particle size ranging between 0.1 and 50 μm and preferably between 0.2 and 20 μm are preferred. The amount of addition of the inorganic fillers is 0 to 30 wt % and preferably 0 to 15 wt %, based on the weight of the resin part of the resin compositions or resin molded products in question. If the amount of addition exceeds the above range, the impact strength as well as the weld strength are lowered.

The flame retardant resin compositions or resin molded products according to the present invention may be admixed with various additives, such as pigments, dyes, lubricants, UV ray absorbers, hindered amine based photostabilizers, antioxidants, halogen supplements, light shielding agents, metal inactivating agents, quenchers, antistatic agents, reinforcing agents or fillers, if so desired, insofar as these do not impair the physical properties of the products. Meanwhile, in-mold casting may be applied for unifying the resin and metal together.

The above materials may be mixed together at proper proportions, mixed, melted and kneaded together to give a flame retardant resin. The mixing and kneading at this time may be carried out by a method consisting of premixing using a routine device, such as a ribbon blender or a drum tumbler, and employing a Banbury mixer, a uniaxial screw extruder, a biaxial screw extruder, a multi-axial screw extruder or a co-kneader. The heating temperature during this melting and kneading is suitably selected in a range between 150 and 300° C., depending on the sort of the resins to be mixed. It is noted that contents other than the recovered DVDs may be melted and kneaded at the outset with polycarbonate resins or other thermoplastic resins and added in this form, that is, in the form of a master batch.

The flame retardant resin of the present invention may be processed by the above-mentioned melting-kneading-molding device from the produced pellets as a starting material into a wide variety of molded products in accordance with an injection molding method, an injection compression molding method, an extrusion molding method, a blow molding method, a press molding method, a vacuum molding method or a foam molding method. The resin composition or the resin molded product prepared from the recovered DVDs may be plated or coated, as necessary.

The plating method for the resin is similar to the routine resin plating method and may be carried out by defatting, chemical etching, chemical plating and electrical plating, and optionally combined with neutralizing processing, catalyst processing or accelerating processing, as necessary. For defatting, a surfactant is used, and for etching, a mixed solution of an oxidizing agent and acid is used. After etching, a sequence of operations including neutralizing processing and catalyst processing or accelerating processing is carried out for the purpose of promoting smooth precipitation of a plating film and improving the bonding tightness between the plating layer and the resin surface. The resulting product is then immersed in a chemical metal plating bath for metal plating. After applying the chemical plating to the molded product by the above method, the chemically plated product is subjected to electrical plating by a known method with copper, nickel or chromium to yield a plated product.

The coating material for the resin may be enumerated by an acryl lacquer based paint, a polyester paint, a dual-liquid epoxy paint (acryl-epoxy based paint, an epoxy-polyester based paint), an acrylic paint, a two-solution acryl-silicon paint, an alkyd paint, a melamine resin based baking paint, an acrylic resin based baking paint, a phthalic acid resin based paint, a fluorine based paint, a cationic electrocoating undercoat paint, a polyurethane resin based paint, an acryl urethane resin based paint, a polyester modified acryl urethane resin based paint, and an alkylated amino resin based paint. These paints may be applied at least once by spraying or dipping, or with the use of a roller or a brush, for coating the resin compositions or resin molded products.

EXAMPLES

Several Examples of the present invention with the recycling method for recovered DVDs as well as several Comparative Examples, for comparison with the Examples, now will be explained. The Examples 1 to 6 and the Comparative Examples 1 to 10 are directed to test pieces, which are prepared by mixing various components in the proportions shown in the following Table 1, followed by kneading, palletizing and thorough drying, supplying the resulting mass to an extrusion molding device and injection molding the resulting dried product.

TABLE 1

| | Resin part | | | | Flame retarder | | Anti-drip agent | |
| | A Component | | B Component | | | Amount of addition | | Amount of addition |
| No. | Sort | (wt %) | Sort | (wt %) | Sort | (wt % based on resin) | Sort | (wt % based on resin) |
|---|---|---|---|---|---|---|---|---|
| Ex. 1 | Recovered DVD | 100 | — | — | — | — | — | — |
| Ex. 2 | Recovered DVD | 90 | PC | 10 | — | — | — | — |
| Ex. 3 | Recovered DVD | 100 | — | — | PSS-Na | 0.1 | PTFE | 0.2 |
| Ex. 4 | Recovered DVD | 80 | ABS | 20 | TPP | 5 | PTFE | 0.2 |
| Ex. 5 | Recovered DVD | 80 | ABS | 20 | ASS-Na/Silicon-based flame retarder | 0.2/0.2 | PTFE | 0.2 |
| Ex. 6 | Recovered DVD | 90 | HIPS | 10 | TPP | 0.5 | PTFE | 0.3 |
| Comp. Ex. 1 | PC | 100 | — | — | — | — | — | — |
| Comp. Ex. 2 | Recovered CD | 100 | — | — | — | — | — | — |
| Comp. Ex. 3 | Recovered CD | 90 | PC | 10 | — | — | — | — |
| Comp. Ex. 4 | PC | 100 | — | — | PSS-Na | 0.1 | PTFE | 0.2 |
| Comp. Ex. 5 | Recovered CD | 100 | — | — | PSS-Na | 0.1 | PTFE | 0.2 |
| Comp. Ex. 6 | PC | 80 | ABS | 20 | TPP | 5 | PTFE | 0.2 |
| Comp. Ex. 7 | Recovered CD | 80 | ABS | 20 | TPP | 5 | PTFE | 0.2 |
| Comp. Ex. 8 | PC | 80 | ABS | 20 | ASS-Na/Silicon-based flame retarder | 0.2/0.2 | PTFE | 0.2 |
| Comp. Ex. 9 | PC | 90 | HIPS | 10 | PSS-Na | 0.5 | PTFE | 0.3 |
| Comp. Ex. 10 | Recovered CD | 90 | HIPS | 10 | PSS-Na | 0.5 | PTFE | 0.3 |

| | Filler | | Flame retarding properties | |
| | | Amount of addition | | |
| No. | Sort | (wt % based no resin) | UL94V | O.I. (%) |
|---|---|---|---|---|
| Ex. 1 | — | — | V-2 | >27 |
| Ex. 2 | — | — | V-2 | >27 |

TABLE 1-continued

|  |  |  |  |  |
|---|---|---|---|---|
| Ex. 3 | — | — | V-0 | >27 |
| Ex. 4 | — | — | V-1 | >27 |
| Ex. 5 | Talcum | 2 | V-0 | >27 |
| Ex. 6 | — | — | V-1 | >27 |
| Comp. Ex. 1 | — | — | V-2NG | ≦25 |
| Comp. Ex. 2 | — | — | V-2NG | ≦25 |
| Comp. Ex. 3 | — | — | V-2NG | ≦25 |
| Comp. Ex. 4 | — | — | V-2 | ≦25 |
| Comp. Ex. 5 | — | — | V-2 | ≦25 |
| Comp. Ex. 6 | — | — | V-2NG | ≦25 |
| Comp. Ex. 7 | — | — | V-2NG | ≦25 |
| Comp. Ex. 8 | Talcum | 2 | V-2 | ≦25 |
| Comp. Ex. 9 | — | — | V-2NG | ≦25 |
| Comp. Ex. 10 | — | — | V-2NG | ≦25 |

As regards various components of the test pieces shown in the above Table 1, the contents of the resins A and B are denoted by wt %, and the amount of addition of other components, that is, the flame retarders, the anti-drip agents and the fillers, are denoted by mass weight parts to 100 weight parts of the resin part formed of the resins A and B.

In the resin part shown in Table 1, PC, HIPS and ABS stand for an optical grade (high fluidity) polycarbonate, a high-impact polystyrene high in the shock-proofing grading and an ABS resin with ordinary fluidity grading, respectively. Out of the flame retarders shown in Table 1, PSS-Na denotes polystyrene sodium sulfonate, with a weight average molecular weight of 70,000, and with the sulfur content being 14 wt %, and ASS-Na denotes sodium sulfonate of the ABS resin, with the sulfur content being 15 wt %. The phosphorus-based flame retarder is triphenyl phosphate, while the silicon based flame retarder is methylphenyl silicone containing vinyl and methoxy groups. In Table 1, the anti-drip agent is PTFE (polytetrafluoroethylene), while the filler is talcum, with the average particle size being 3 μm.

For the respective test pieces shown in these Examples and the Comparative Examples, tests were conducted for evaluating the characteristics of the flame retarding properties. More specifically, perpendicular combustion tests (UL94V-0, 1, 2), conforming to "Combustion Tests for Plastic Materials of UL subject 94 (Underwriter Laboratories Inc.)," were conducted for the respective test pieces. In addition, combustion tests conforming to "Combustion Test Methods for High Molecular Materials by Oxygen Index Method" of Japan Industrial Standard JIS K7201 were conducted to measure the oxygen index (O.I.). Meanwhile, each test piece was of a thickness of 0.1 mm.

As may be seen from a comparison of the test piece of Example 1 with the test pieces of Comparative Examples 1 and 2 and from a comparison of the test piece of Example 3 with the test pieces of Comparative Examples 4 and 5, as shown in Table 1, the recovered DVDs are superior in flame retarding properties to virgin PC resin or recovered CDs.

In addition, as may be seen from a comparison of the test piece of Example 4 with the test pieces of Comparative Examples 6 and 7 and from a comparison of the test piece of Example 5 with the test pieces of Comparative Examples 9 and 10, flame retardant properties are improved further by mixing other resins or other flame retarders.

It may be seen from above that a resin composition superior in flame retardant properties may be obtained by employing the recovered DVDs as a feedstock.

It should be understood by those skilled in the art that various modifications, combinations, subcombinations and alterations may occur depending on design requirements and other factors insofar as they are within the scope of the appended claims or the equivalents thereof.

What is claimed is:

1. A recycling method
   using a recovered disc, containing a material of at least one coating film, out of a reflective film, a recording film, a protective film and an ink film, deposited on a disc substrate in addition to an adhesive used for bonding a plurality of the disc substrates together, as a starting material for preparing a flame retardant resin composition or resin molded product,
   wherein the flame retardant resin composition or resin molded product contains said at least one coating film in addition to said adhesive used for bonding.

2. The recycling method for a recovered disc according to claim 1 wherein said recovered discs are contained in a proportion of 5 to 90 wt % in said flame retardant resin composition or resin molded product.

3. The recycling method for a recovered disc according to claim 1 wherein said recovered disc containing at least one of a hydroxyl group, a phosphoric acid (phosphate) group, a diazonium salt group, an iodonium salt group and a carboxyl group, as said adhesive, is used as a starting material for preparing a flame retardant resin composition or resin molded product.

4. The recycling method for a recovered disc according to claim 3 wherein the proportion of said adhesive contained in said flame retardant resin composition or resin molded product ranges between 0.005 wt % to 20 wt %.

5. The recycling method for a recovered disc according to claim 1 wherein at least one of PC (polycarbonate), ABS (acrylonitrile butadiene styrene copolymer), AS (acrylonitrile styrene copolymer), PS (polystyrene), HIPS (high-impact polystyrene), a PC/ABS alloy, a PC/HIPS alloy, a PC/PP (polypropylene) alloy, a PC/PE (polyethylene) alloy, a PC/PMMA (methyl polymethacrylate), PC/PBT (polybutylene terephthalate) alloy and a PC/nylon alloy, is contained along with said recovered discs.

6. A flame retardant resin composition containing at least one coating material in addition to an adhesive used for bonding is prepared from a recovered disc used as a starting material, said recovered disc containing, along with the adhesive used for bonding a plurality of disc substrates together, said at least one coating materials comprising one of a reflective film, a recording film, a protective film and an ink film, formed on said disc substrates.

7. The flame retardant resin composition according to claim 6 wherein 5 to 90 wt % of said recovered discs are contained in the starting material.

8. The flame retardant resin composition according to claim 6 wherein the recovered disc containing at least one of a hydroxyl group, phosphoric acid (phosphate) group, a sulfonium salt group, a diazonium salt group, an iodonium salt group and a carboxyl group, as said adhesive, is used as a starting material.

9. The flame retardant resin composition according to claim 8 wherein the content of said adhesive is 0.005 to 20 wt %.

10. The flame retardant resin composition according to claim 6 wherein at least one of a PC (polycarbonate), ABS (acrylonitrile butadiene styrene copolymer), AS (acrylonitrile styrene copolymer), PS (polystyrene), HIPS (high-impact polystyrene), a PC/ABS alloy, a PC/PS alloy, a PC/HIPS alloy, a PC/PP (polypropylene) alloy, a PC/PE (polyethylene) alloy, a PC/PMMA (methyl polymethacrylate) alloy, a PC/PET (polyethylene terephthalate) alloy, a PC/PBT (polybutylene terephthalate) alloy and a PC/nylon alloy, is contained in the starting material for said flame retardant resin composition or resin molded product along with said recovered discs.

11. A flame retardant resin molded product containing at least one coating material in addition to an adhesive used for bonding is prepared from a recovered disc used as a starting material, said recovered disc containing, along with the adhesive used for bonding a plurality of disc substrates together, said at least one coating material comprising one of a reflective film, a recording film, a protective film and an ink film, formed on said disc substrates.

12. The flame retardant resin molded product according to claim 11 wherein 5 to 90 wt % of said recovered discs are contained in the starting material.

13. The flame retardant resin molded product according to claim 11 wherein the recovered disc containing at least one of a hydroxyl group, phosphoric acid (salt) group, a sulfonium salt group, a diazonium salt group, an iodonium salt group and a carboxyl group, as said adhesive, is used as a starting material.

14. The flame retardant resin molded product according to claim 13 wherein the content of said adhesive is 0.005 to 20 wt %.

15. The flame retardant resin molded product according to claim 11 wherein at least one of a PC (polycarbonate), ABS (acrylonitrile butadiene styrene copolymer), AS (acrylonitrile styrene copolymer), PS (polystyrene), HIPS (high-impact polystyrene), a PC/ABS alloy, a PC/PS alloy, a PC/HIPS alloy, a PC/PP (polypropylene) alloy, a PC/PE (polyethylene) alloy, a PC/PMMA (methyl polymethacrylate) alloy, a PC/PET (polyethylene terephthalate) alloy, a PC/PBT (polybutylene terephthalate) alloy and a PC/nylon alloy, is contained along with said recovered discs.

16. The recycling method for a recovered disc according to claim 1, wherein at least one of a halogen-based flame retarder, a phosphorus-based flame retarder, a nitrogen-based flame retarder, an inorganic flame retarder, a silicon-based flame retarder, a metal salt based flame retarder and a fluorine-based flame retarder is contained as a flame retarder in said flame retardant resin composition or resin molded product along with said recovered disc.

17. The recycling method for a recovered disc according to claim 16, wherein the flame retarder is a metal salt based flame retarder.

18. The recycling method for a recovered disc according to claim 16, wherein the flame retarder is a sulfone series flame retarder.

19. The recycling method for a recovered disc according to claim 16, wherein said recovered disc is a DVD disc.

20. The flame retardant resin composition according to claim 6, wherein the flame retarder is a metal salt based flame retarder, wherein at least one of a halogen-based flame retarder, a phosphorus-based flame retarder, a nitrogen-based flame retarder, an inorganic flame retarder, a silicon-based flame retarder, a metal salt based flame retarder and a fluorine-based flame retarder is contained as a flame retarder along with said recovered disc.

21. The flame retardant resin composition according to claim 20, wherein the flame retarder is a metal salt based flame retarder.

22. The flame retardant resin composition according to claim 20, wherein the flame retarder is a sulfone series flame retarder.

23. The flame retardant resin composition according to claim 20, wherein said recovered disc is a DVD disc.

24. The flame retardant resin molded product according to claim 11, wherein the flame retarder is a metal salt based flame retarder, wherein at least one of a halogen-based flame retarder, a phosphorus-based flame retarder, a nitrogen-based flame retarder, an inorganic flame retarder, a silicon-based flame retarder, a metal salt based flame retarder and a fluorine-based flame retarder is contained as a flame retarder along with said recovered disc.

25. The flame retardant resin molded product according to claim 24, wherein the flame retarder is a metal salt based flame retarder.

26. The flame retardant resin molded product according to claim 24, wherein the flame retarder is a sulfone series flame retarder.

27. The flame retardant resin molded product according to claim 24, wherein said recovered disc is a DVD disc.

* * * * *